United States Patent
Cox et al.

(10) Patent No.: US 8,315,746 B2
(45) Date of Patent: Nov. 20, 2012

(54) THERMAL MANAGEMENT TECHNIQUES IN AN ELECTRONIC DEVICE

(75) Inventors: Keith Cox, Campbell, CA (US); Andrew Bradley Just, San Francisco, CA (US); Matthew G. Watson, San Francisco, CA (US); Eric Albert, Mountain View, CA (US); David Powers, Morgan Hill, CA (US); Daniel Ariel West, San Jose, CA (US); Donald J. Novotney, San Jose, CA (US); Michael F. Culbert, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 392 days.

(21) Appl. No.: 12/370,946

(22) Filed: Feb. 13, 2009

(65) Prior Publication Data

US 2009/0299543 A1 Dec. 3, 2009

Related U.S. Application Data

(60) Provisional application No. 61/057,767, filed on May 30, 2008.

(51) Int. Cl.
*G05D 23/00* (2006.01)
*G05B 11/01* (2006.01)
*H02J 7/04* (2006.01)
*G06F 1/00* (2006.01)
*H01M 10/50* (2006.01)
*G01K 1/08* (2006.01)

(52) U.S. Cl. .............. 700/299; 700/30; 700/31; 700/33; 320/144; 320/150; 320/153; 429/62; 702/132; 713/340

(58) Field of Classification Search .................. 700/30, 700/31, 33, 299; 320/144, 150, 153; 429/62; 702/132; 713/340
See application file for complete search history.

(56) References Cited

U.S. PATENT DOCUMENTS 3,730,985 A * 5/1973 Whitney ....................... 348/164
(Continued)

FOREIGN PATENT DOCUMENTS

DE 102006002904 A1 8/2007
(Continued)

OTHER PUBLICATIONS

PCT International Search Report and Written Opinion (dated Mar. 11, 2009), International Application No. PCT/US2009/041036, International Filing Date—Apr. 17, 2009, (20 pages).

(Continued)

*Primary Examiner* — Charles Kasenge
*Assistant Examiner* — Thomas Stevens
(74) *Attorney, Agent, or Firm* — Blakely, Sokoloff, Taylor & Zafman LLP

(57) ABSTRACT

A thermal manager has a digital filter whose input is to receive raw temperature values from a sensor and whose output is to provide processed or filtered temperature values according to a filter function that correlates temperature at the sensor with temperature at another location in the device. The thermal manager has a look-up table that further correlates temperature at the sensor with temperature at the other location. The look-up table contains a list of processed temperature sensor values, and/or a list of temperatures representing the temperature at the other location, and their respective power consumption change commands. The thermal manager accesses the look-up table using selected, filtered temperature values, to identify their respective power consumption change commands. The latter are then evaluated and may be applied, to mitigate a thermal at the other location. Other embodiments are also described and claimed.

18 Claims, 7 Drawing Sheets

U.S. PATENT DOCUMENTS

| | | | |
|---|---|---|---|
| 4,445,636 A | 5/1984 | Peters | |
| 4,465,077 A * | 8/1984 | Schneider | 600/551 |
| 4,845,647 A * | 7/1989 | Dils et al. | 702/102 |
| 5,167,024 A | 11/1992 | Smith et al. | |
| 5,520,153 A | 5/1996 | Milunas | |
| 5,532,935 A | 7/1996 | Ninomiya et al. | |
| 5,627,412 A | 5/1997 | Beard | |
| 5,739,670 A * | 4/1998 | Brost et al. | 320/131 |
| 5,812,860 A | 9/1998 | Horden et al. | |
| 5,814,973 A * | 9/1998 | Liu | 320/137 |
| 5,825,674 A | 10/1998 | Jackson | |
| 5,842,027 A | 11/1998 | Oprescu et al. | |
| 5,915,838 A | 6/1999 | Stals et al. | |
| 5,963,424 A | 10/1999 | Hileman et al. | |
| 5,964,879 A | 10/1999 | Dunstan et al. | |
| 6,122,758 A | 9/2000 | Johnson et al. | |
| 6,134,667 A | 10/2000 | Suzuki et al. | |
| 6,191,546 B1 * | 2/2001 | Bausch et al. | 318/471 |
| 6,207,936 B1 * | 3/2001 | de Waard et al. | 219/497 |
| 6,270,252 B1 | 8/2001 | Siefert | |
| 6,349,269 B1 * | 2/2002 | Wallace, Jr. | 702/132 |
| 6,415,388 B1 | 7/2002 | Browning et al. | |
| 6,477,156 B1 | 11/2002 | Ala-Laurila et al. | |
| 6,507,282 B1 * | 1/2003 | Sherwood | 340/607 |
| 6,594,771 B1 | 7/2003 | Koerber et al. | |
| 6,718,474 B1 | 4/2004 | Somers et al. | |
| 6,745,117 B1 | 6/2004 | Thacher et al. | |
| 6,888,332 B2 | 5/2005 | Matsushita | |
| 6,925,573 B2 | 8/2005 | Bodas | |
| 6,952,782 B2 | 10/2005 | Staiger | |
| 6,986,069 B2 | 1/2006 | Oehler et al. | |
| 7,019,638 B1 | 3/2006 | Wallace | |
| 7,036,027 B2 | 4/2006 | Kim et al. | |
| 7,111,178 B2 | 9/2006 | Rusu et al. | |
| 7,134,029 B2 | 11/2006 | Hepner et al. | |
| 7,139,920 B2 | 11/2006 | Williams | |
| 7,162,651 B2 | 1/2007 | Brockhaus | |
| 7,171,570 B2 | 1/2007 | Cox et al. | |
| 7,177,728 B2 | 2/2007 | Gardner | |
| 7,178,043 B2 | 2/2007 | Nakazato | |
| 7,194,646 B1 | 3/2007 | Watts, Jr. | |
| 7,221,862 B1 * | 5/2007 | Miller et al. | 392/498 |
| 7,228,448 B2 | 6/2007 | Anderson et al. | |
| 7,272,732 B2 | 9/2007 | Farkas et al. | |
| 7,295,949 B2 | 11/2007 | Vorenkamp et al. | |
| 7,353,133 B2 | 4/2008 | Park | |
| 7,421,598 B2 | 9/2008 | Brittain et al. | |
| 7,451,332 B2 | 11/2008 | Culbert et al. | |
| 7,529,948 B2 | 5/2009 | Conroy et al. | |
| 7,562,234 B2 | 7/2009 | Conroy et al. | |
| 7,574,321 B2 * | 8/2009 | Kernahan et al. | 702/179 |
| 7,640,760 B2 | 1/2010 | Bash et al. | |
| 7,788,516 B2 | 8/2010 | Conroy et al. | |
| 7,802,120 B2 | 9/2010 | Conroy et al. | |
| 7,949,888 B2 | 5/2011 | Cox et al. | |
| 7,949,889 B2 | 5/2011 | Sotomayor, Jr. et al. | |
| 8,120,325 B2 * | 2/2012 | Wolf et al. | 320/136 |
| 2001/0021217 A1 | 9/2001 | Gunther et al. | |
| 2002/0007463 A1 | 1/2002 | Fung | |
| 2002/0020755 A1 | 2/2002 | Matsushita | |
| 2002/0065049 A1 | 5/2002 | Chauvel et al. | |
| 2002/0083354 A1 | 6/2002 | Adachi | |
| 2002/0099962 A1 | 7/2002 | Nakamura | |
| 2002/0130788 A1 * | 9/2002 | Chang | 340/825.72 |
| 2002/0143488 A1 | 10/2002 | Cooper et al. | |
| 2002/0149911 A1 | 10/2002 | Bishop et al. | |
| 2002/0194509 A1 | 12/2002 | Plante et al. | |
| 2003/0053293 A1 | 3/2003 | Beitelmal et al. | |
| 2003/0076065 A1 | 4/2003 | Shafer et al. | |
| 2003/0126475 A1 | 7/2003 | Bodas | |
| 2003/0179040 A1 * | 9/2003 | Kossor | 330/136 |
| 2003/0188210 A1 | 10/2003 | Nakazato | |
| 2004/0003301 A1 | 1/2004 | Nguyen | |
| 2004/0003303 A1 | 1/2004 | Oehler et al. | |
| 2004/0044914 A1 | 3/2004 | Gedeon | |
| 2004/0064745 A1 | 4/2004 | Kadambi | |
| 2004/0088590 A1 | 5/2004 | Lee et al. | |
| 2004/0117680 A1 | 6/2004 | Naffziger | |
| 2004/0131104 A1 | 7/2004 | Seferian | |
| 2004/0133816 A1 | 7/2004 | Miyairi et al. | |
| 2004/0148258 A1 | 7/2004 | Tillett | |
| 2004/0148528 A1 | 7/2004 | Silvester | |
| 2004/0159240 A1 | 8/2004 | Lyall | |
| 2004/0163001 A1 | 8/2004 | Bodas | |
| 2004/0181698 A1 | 9/2004 | Williams | |
| 2004/0210787 A1 | 10/2004 | Cox et al. | |
| 2005/0015764 A1 | 1/2005 | Gaur | |
| 2005/0041000 A1 * | 2/2005 | Plut | 345/39 |
| 2005/0049729 A1 | 3/2005 | Culbert et al. | |
| 2005/0055590 A1 | 3/2005 | Farkas et al. | |
| 2005/0102539 A1 | 5/2005 | Hepner et al. | |
| 2005/0115945 A1 * | 6/2005 | Kesteren et al. | 219/390 |
| 2005/0132371 A1 | 6/2005 | Lopez-Estrada | |
| 2005/0136989 A1 | 6/2005 | Dove | |
| 2005/0138440 A1 | 6/2005 | Barr et al. | |
| 2005/0143865 A1 | 6/2005 | Gardner | |
| 2005/0149540 A1 | 7/2005 | Chan et al. | |
| 2005/0182986 A1 | 8/2005 | Anderson et al. | |
| 2005/0196662 A1 * | 9/2005 | Prema et al. | 429/50 |
| 2005/0210304 A1 | 9/2005 | Hartung et al. | |
| 2005/0240786 A1 | 10/2005 | Ranganathan | |
| 2005/0278556 A1 | 12/2005 | Smith et al. | |
| 2006/0005057 A1 | 1/2006 | Nalawadi et al. | |
| 2006/0006166 A1 | 1/2006 | Chen et al. | |
| 2006/0013281 A1 | 1/2006 | Sri-Jayantha et al. | |
| 2006/0036878 A1 | 2/2006 | Rothman et al. | |
| 2006/0047983 A1 | 3/2006 | Aleyraz et al. | |
| 2006/0168456 A1 | 7/2006 | Chaudhry et al. | |
| 2006/0190745 A1 | 8/2006 | Matsushima et al. | |
| 2006/0190749 A1 | 8/2006 | He et al. | |
| 2006/0239328 A1 | 10/2006 | Sumi | |
| 2006/0248354 A1 | 11/2006 | Pineda De Gyvez et al. | |
| 2006/0288241 A1 | 12/2006 | Felter et al. | |
| 2006/0294400 A1 | 12/2006 | Diefenbaugh et al. | |
| 2007/0016706 A1 | 1/2007 | Arnold et al. | |
| 2007/0049134 A1 | 3/2007 | Conroy et al. | |
| 2007/0050644 A1 | 3/2007 | Merkin | |
| 2007/0050646 A1 | 3/2007 | Conroy et al. | |
| 2007/0050647 A1 | 3/2007 | Conroy et al. | |
| 2007/0067136 A1 | 3/2007 | Conroy et al. | |
| 2007/0083779 A1 | 4/2007 | Misaka et al. | |
| 2007/0101173 A1 * | 5/2007 | Fung | 713/300 |
| 2007/0255972 A1 | 11/2007 | Gaskins et al. | |
| 2008/0276111 A1 | 11/2008 | Jacoby et al. | |
| 2009/0177422 A1 | 7/2009 | Cox et al. | |
| 2009/0177907 A1 | 7/2009 | Sotomayor, Jr. et al. | |
| 2009/0299543 A1 | 12/2009 | Cox et al. | |
| 2010/0040085 A1 | 2/2010 | Olderdissen et al. | |

FOREIGN PATENT DOCUMENTS

| | | |
|---|---|---|
| EP | 0404567 A1 | 12/1990 |
| EP | 0632 360 A1 | 1/1995 |
| EP | 1231695 A2 | 8/2002 |
| EP | 1286456 A1 | 2/2003 |
| EP | 1762924 A1 | 3/2007 |
| GB | 2405236 A | 2/2005 |
| JP | 62162565 | 7/1987 |
| JP | 2002-175131 | 6/2002 |
| KR | 2002-0002799 | 1/2002 |
| WO | WO 03/060678 A2 | 7/2003 |
| WO | WO 2007/024403 A2 | 3/2007 |

OTHER PUBLICATIONS

Cox, Keith, et al., "A Method for Estimating Temperature at a Critical Point", U.S. Appl. No. 12/250,498, filed Oct. 13, 2008, (47 pages).

PCT International Preliminary Report on Patentability (dated Apr. 28, 2011), International Application No, PCT/US2009/060253, International Filing Date—Oct. 9, 2009, (12 pages).

PCT International Search Report and Written Opinion (dated Nov. 11, 2010), International Application No. PCT/US2009/060253, International Filing Date—Oct. 9, 2009, (18 pages).

PCT International Report on Patentability and Written Opinion (dated Nov. 30, 2010), International Application No. PCT/US2009/041036, International Filing Date—Apr. 17, 2009, (11 pages).

PCT Invitation to Pay/Partial International Search (dated Feb. 7, 2009), International Application No. PCT/US2009/041036, International Filing Date—Apr. 17, 2009, [4 pages].

PCT International Preliminary Report on Patentability and Written Opinion for PCT International Application No. PCT/US2006/029244, mailed Mar. 6, 2008, 14 pages.

PCT International Search Report and Written Opinion for PCT International Application No. PCT/US2008/013975 mailed Mar. 17, 2009, 13 pages.

PCT International Preliminary Report and Written Opinion for PCT International Application No. US2006/029049 mailed Nov. 29, 2006, 14 pages.

PCT Preliminary Report on Patentability and Written Opinion for PCT International Application No. PCT/US2006/029049, mailed Mar. 6, 2008, 10 pages.

PCT International Search Report and Written Opinion for PCT International Application No. US2008/014036 mailed Jul. 22, 2010, 14 pages.

PCT Search Report and Written Opinion for PCT/US2006/029244, mailed Sep. 17, 2007, 22 pages.

PCT International Preliminary Report on Patentability (dated Apr. 28, 2011), International Application No. PCT/US2009/060253, International Filing Date—Oct. 09, 2009, (12 pages).

Non-Final Office Action (dated Oct. 20, 2011), U.S. Appl. No. 12/250,498, Date Filed—Oct. 13, 2008, 11 pages.

* cited by examiner

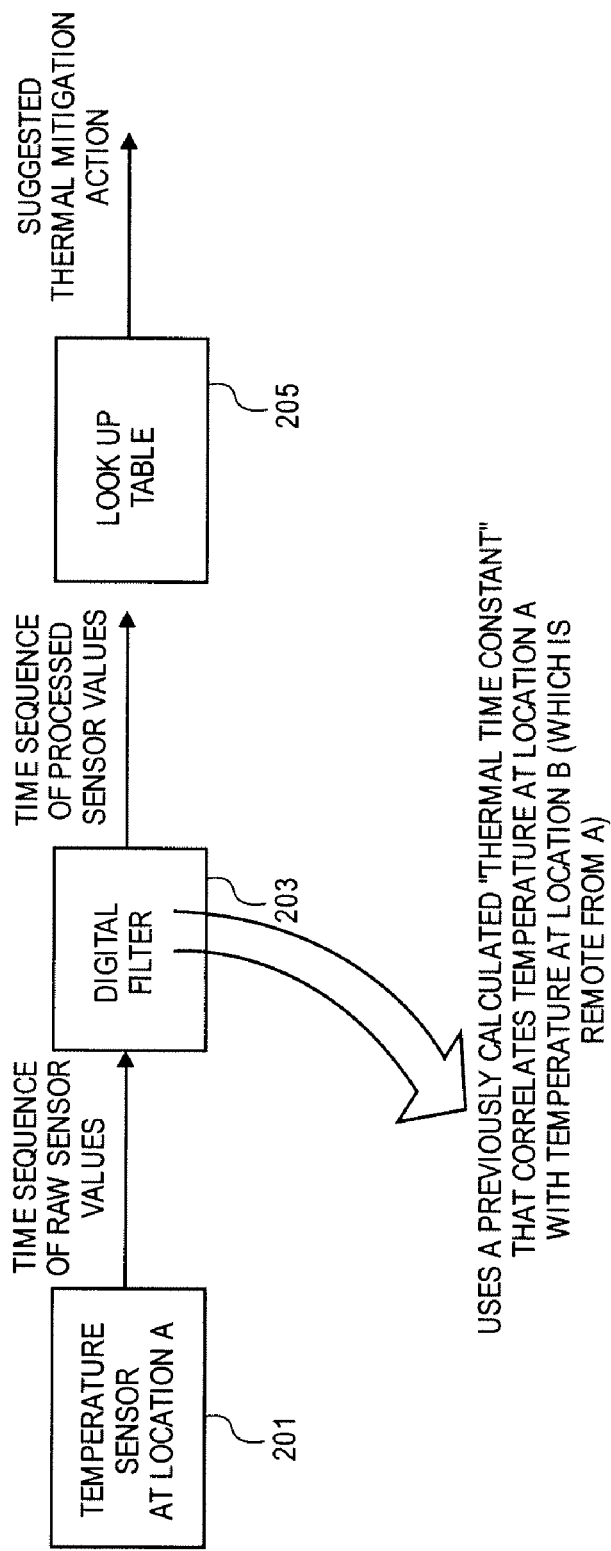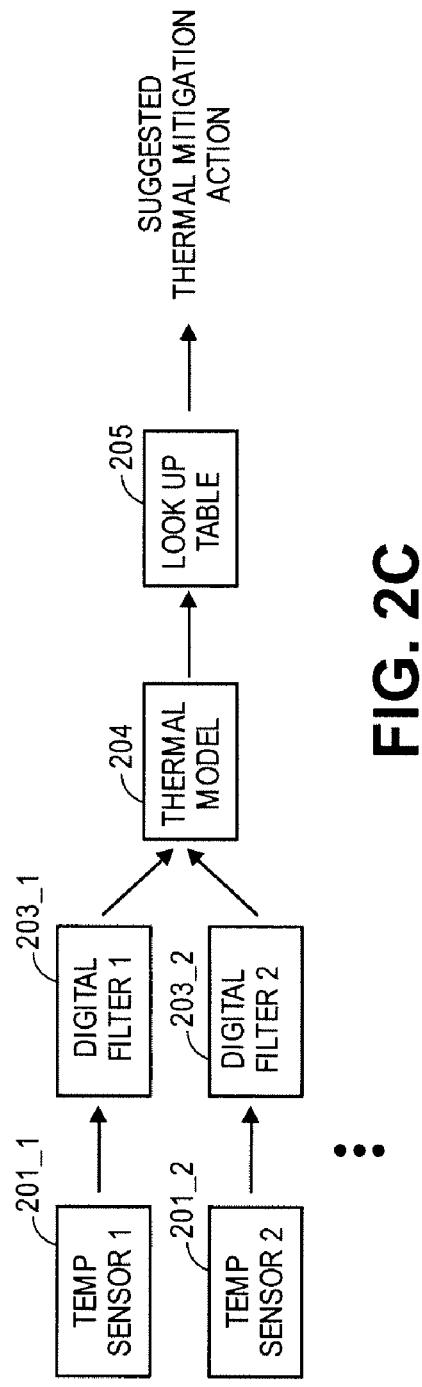
FIG. 2B
FIG. 2C

THERMAL MANAGEMENT TECHNIQUES IN AN ELECTRONIC DEVICE

RELATED APPLICATIONS

This application claims the benefit of the earlier filing date of U.S. provisional application No. 61/057,767 filed May 30, 2008. Certain subject matter described in this patent application is related to material in U.S. patent application Ser. No. 12/250,498 filed Oct. 13, 2008.

BACKGROUND

Consumers' appetite for more performance and functionality from a portable handheld wireless communications device (such as a cellular telephone) typically outpaces developments in battery technology and low power consumption electronics. Thus, manufacturers of such devices are forced to find better ways of dealing with reduced battery life and high temperature effects (thermals). Various power management processes have been developed as software that runs in desktop and laptop personal computers, to better manage the computer's power consumption while providing a reasonable level of performance for the user. For instance, so-called low power techniques use display screen dimming and processor clock throttling to lengthen battery life. In other cases, the speed of a cooling fan inside the computer is modulated, to regulate the internal temperature of the computer, i.e. control thermal situations in the computer. More recently, the power consumption of certain integrated circuit components in a portable laptop or notebook personal computer have been controlled or managed, to improve thermal characteristics therein.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIGS. 1-2A are graphs showing simulated thermal behaviors.

FIG. 2B is a block diagram of components that perform a thermal management process in an electronic device.

FIG. 2C is a block diagram of components that perform a more sophisticated thermal management process.

DETAILED DESCRIPTION

Figure 1:
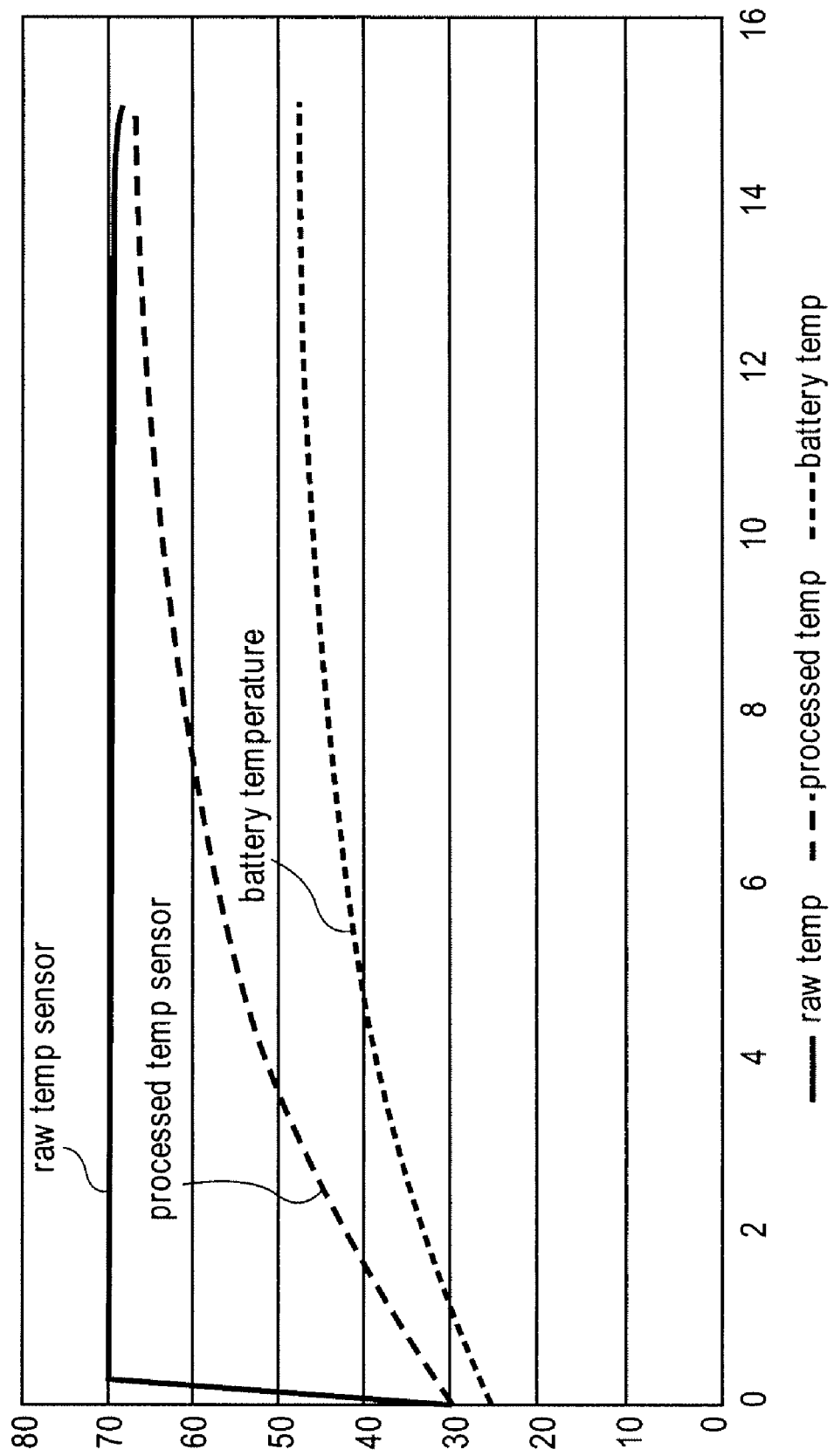

An embodiment of the invention is directed to an improved thermal management process running in a portable handheld wireless communications device that has relatively confined internal space, to manage the device's own thermal behavior but without significantly impacting the user experience. There are at least two relevant aspects to such a process. First, the behavior of the device is managed so that the temperature of the device's battery (or other rechargeable main power source) stays within a given predefined range. See, e.g. Certification Requirements for Battery System Compliance to IEEE 1725, October 2007, Revision 1.4 (CTIA Certification Program). This is because battery temperature may quickly rise to undesirable levels during even normal operation of the device, e.g. when using a device that has been left inside a parked automobile in the sun, to make a cellular phone call. In part, this may be due to the operation of certain power hungry integrated circuit components of the device, such as the RF power amplifier (PA) that drives the device's cellular network RF communications antenna. For example, the RF PA often responds to requests from a base station, with which the device is registered, to increase its RF output power if the base station determines that signal from the device is weakening for any reason. This, together with the normal current drawn by the remaining electrical components, may significantly increase the heat that must be dissipated, due to the electrical power consumption by the RF PA, thereby causing the battery to quickly heat up due to its relative proximity to the RF PA.

A second thermal arena to monitor and manage in the device is the device's external case temperature. This should also be kept in a predefined range, e.g. as specified by Underwriters Laboratories (UL) for consumer grade cellular telephone handsets. During normal operation, the external case of the device should not become so warm as to become uncomfortable for the user, e.g. while it is being held in the users hand or against the user's ear. The external case may be heated by any power consumed within the device, and the hottest points on the external case will most likely be in proximity to the circuitry with the highest concentration of power dissipation. In one embodiment, this may be the RF PA, as in the example above, or it may be another component or group of components, such as the application processor in a mobile telephone or smart phone.

A given mobile device may include more than one source of heat that individually, or in concert with others, causes either one or both of the battery and the external case temperature to rise above the desired maximum temperature. Also, the inventions described in this document are not limited to managing the temperature of batteries and external cases, but are applicable to any undesirable thermal behavior in the mobile device.

In this description, all references to temperature values are in degrees centigrade.

The process of thermal management needs accurate information about the temperature in various places of the device. For example, multiple temperature sensors can be built into the device, and then calibrated before use. These may be in contact with or located near their respective components to be monitored. Temperature readings are "sensed" by such sensors, e.g. by passing a known current through a thermistor during normal operation of the device, measuring its voltage and calculating its resistance. In contrast, there are also indirect mechanisms that can be used for measuring temperature. For example, during the device's design and testing in the laboratory, the power consumption of a component (e.g., a microprocessor) can be sensed over a period of time. This type of power consumption and associated time interval data can then be correlated with direct temperature measurements of the component taken during testing. A mathematical and/or lookup table relationship is then derived, which is then stored in the device for later use "in the field", i.e. normal operation of the device by the end user or consumer. While in the field, thermal management decisions can be automatically made in the device, e.g. by executing software, based on "effective" temperature readings that have been computed or looked up using the stored relationship, as a function of sensed power consumption measurements.

There are several heat-generating components of the device that may be automatically controlled, to efficiently improve the thermal behavior of the different arenas (for example, the battery and the external case) of the device. One is the cellular network RF transceiver PA whose output RF power can be limited so as to override a contrary request from the cellular base station. Another is a central processing unit (CPU), e.g. its microprocessor clock can be throttled down or its power supply voltage may be reduced at the expense of reduced performance. Yet another is the backlight of the device's main display screen, which can be dimmed at the expense of reduced display clarity.

In one embodiment of the invention, a "thermal time constant" or thermal decay parameter may be defined for a given component or area of the device. This parameter or function may describe the relationship over time between (1) the temperature of a given component or target area of the device and (2) the temperature of a remote location. The thermal time constant takes into account the realization that while the output of a temp sensor could jump to a high value, indicating a fast rise in temperature at that location, the temperature of a remote, target location (that may also be affected by the same increased heat) will rise more slowly (e.g., along a substantially different curve). This is illustrated in the example, simulated temperature response graph of FIG. 1. This graph shows the simulated behavior of actual battery temperature (degrees) over time (minutes), responding to a sudden increase in heat that is producing essentially a step response in the raw temperature data output by a sensor that is remote from the battery. The graph shows the result of processing the raw temp sensor data using the appropriate thermal time constant, to yield a somewhat exponential-looking curve. The processing includes a low pass filtering function that translates an essentially instantaneous change (from some other temperature to 70 degrees) into a much slower change.

FIG. 1 also illustrates another aspect of thermal behavior in the device, namely that the "steady state" temperatures of the sensor and the target location may be different. Note how the processed temp sensor curve is similar in shape to the battery temp curve, but not in absolute value—70 degrees at the sensor means only 50 degrees at the battery (after about fifteen minutes). To make this adjustment, a further mathematical function (derived from the processed temp sensor data and the actual temperature of the target location) can be applied to the processed data. Examples of such functions can be seen in equations 1 and 2 described below.

While FIG. 1 depicts a simulated step response, FIG. 2 shows simulated random heating occurring in the device. Note how the relatively sharp edges of the raw temp sensor curve have been smoothed out by the thermal time constant-based processing.

Different components of the device may have different-valued thermal time constants or thermal decay parameters, which is a function of how quickly the heat produced by the component can be dissipated by the device. For example, the CPU may normally be subjected to its peak power consumption level for a relatively long period of time before its temperature reaches an upper threshold (e.g., several minutes). In contrast, peak RF output power by the cellular network RF transceiver PA can only be sustained for a much shorter period of time (before an upper thermal threshold is reached). The thermal time constant of a component may also incorporate the following characteristics: several, relatively frequently occurring and long periods of low power consumption by a component can lead to the same elevated temperature that would result if the component were subjected to fewer and shorter periods of high power consumption. Below are some example time constant parameters for the device 100 described below.

TABLE 0

| Remote Temperature Sensor Location | Time Constant | Correlation Temperature (target location) |
|---|---|---|
| RF Power Amplifier | 15 seconds | Battery Hot Spot |
| Battery | 220 seconds | Back Case Center |

The table above gives an example for two remote temperature sensors, one located near the RF PA and another located at the battery (though perhaps not necessarily at the battery's hot spot). There may however be more than two sensors in the device, e.g. another located on-chip with a cellular baseband processor and another located in a different area than all of the others so as to give a better estimate of the ambient temperature inside the device, e.g. near a subscriber identity module, SIM, card circuit.

A generic thermal management process or system that uses a thermal time constant to compute or estimate the real temperature behavior (over a given time interval) of a target location (the "correlation temperature" in Table 0 above) is now described. Referring to the block diagram of FIG. 2B, for a temperature of interest (e.g., that of the battery hot spot or the back case center), output from an associated temperature sensor 201 is processed using the associated thermal time constant. The temperature sensor 201 may be a thermistor, or it may be a suitable alternative. A digital filter 203, such as a single-pole Infinite Impulse Response (IIR) filter, has a response characterized by a thermal time constant given in Table 0. The digital filter transforms a time sequence of immediate or raw sensor readings or values, for example from the RF temperature sensor, into effective or estimated temperatures (processed sensor values) relating to the target location, for example, the battery hot spot. Note that if the thermal time constant has been correctly determined, the time sequence of computed effective temperatures or processed sensor values (at the output of the digital filter 203) will have time response characteristics that are similar in profile to the real temperatures of interest (namely those of location B), though they may be different in terms of absolute value. It is these effective temperatures or processed sensor values, computed by the signal processing operation defined by the thermal time constant, that are then used to monitor the real thermal behavior of the target location in any subsequent thermal management operation. For example, in FIG. 2B, a sample taken from the time sequence of processed sensor values is applied to a previously calculated look-up table 205, to find a matching, suggested thermal mitigation action (if any). Tables 1 and 2 below are examples of such look-up tables. The look-up table may be implemented as a data structure stored in memory.

In other embodiments of this invention, more sophisticated signal processing techniques may be applied within the digital filter 203, to compute the effective temperatures or processed sensor values, including but not limited to multiple-pole filters or Finite Impulse Response (FIR) filters, in order to improve the correlation between the available sensors and the real temperature of the target location.

In other embodiments of this invention, more sophisticated statistical analysis techniques may be applied to predict the real thermal behavior of the target location—see FIG. 2C. As shown in that figure, the digital filter output of multiple sensors 201_1, 201_2, . . . (using multiple digital filters 203_1, 203_2, . . . ) are transformed through a mathematical "thermal model" implemented by a temperature calculator 204, into a final prediction of the temperature at the target location. Techniques to build this thermal model include, but are not limited to, Principal Component Analysis and Multiple Linear Regression. See also U.S. patent application Ser. No. 12/250, 498 filed Oct. 13, 2008 that has been assigned to the same assignee as that of the present application, for additional details concerning the particular approach taken in FIG. 2C for estimating the temperature of the remote, target location.

Before describing various thermal management processes in detail, several components of the wireless communications device are now described and which may be viewed as controllable heat sources that may be commanded to reduce their power consumption (pursuant to a suggested thermal mitigation action obtained from the look-up table 205, see FIG. 2B). First, there is the display screen backlight. A light emitting diode (LED) backlight has the following characteristic: its light output decreases about in direct proportion to a decrease in its power consumption. However, the response of the human visual perception system to light intensity is approximately logarithmic, in the sense that a large increase in light intensity (e.g., a doubling of backlight power) is needed to achieve a relatively small improvement in perceived brightness. To take advantage of these characteristics, in one embodiment of the thermal management process, the default backlight power is set to, for example, about 50% of its maximum specified power. Thereafter, when there is a threshold thermal event, the backlight power is reduced to an amount that yields about one half the perceived brightness by a human. This has been experimentally determined to be about 20% of the maximum specified power of a typical LED backlight used in handheld device applications such as cellular phones. Lowering the backlight power further has been found to not result in an appreciable decrease in the heat produced by the backlight, and in fact is likely to make the display screen very difficult to see. This process helps achieve a significant reduction in heat produced by the backlight, without significantly impacting the user's experience with the device.

Another component or function in the device 100 that may be commanded to drop its power consumption is the transmit rate of the cellular network transceiver. For example, the device may have third generation, 3G, cellular network communications hardware and software that enable its user to surf the Web, check email, and download video at greater speeds. In that case, the device may reduce its 3G, High Speed Downlink Packet Access, HSDPA, transmit rate or limit its RF output power in response to a thermal event.

Figure 3:
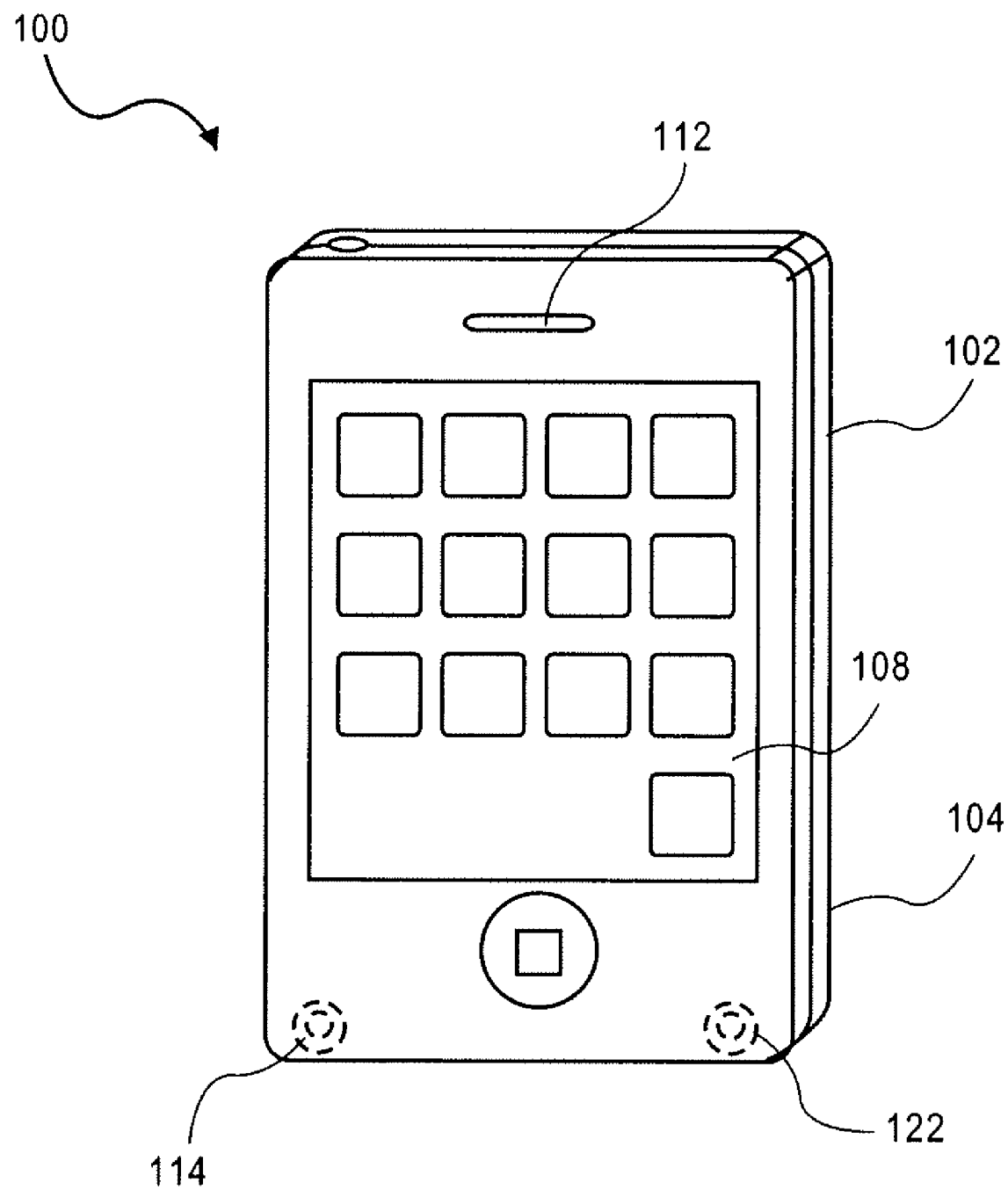
FIG. 3 is an external elevation view of an example electronics device in which a thermal management process in accordance with an embodiment of the invention can be running.
Figure 4:
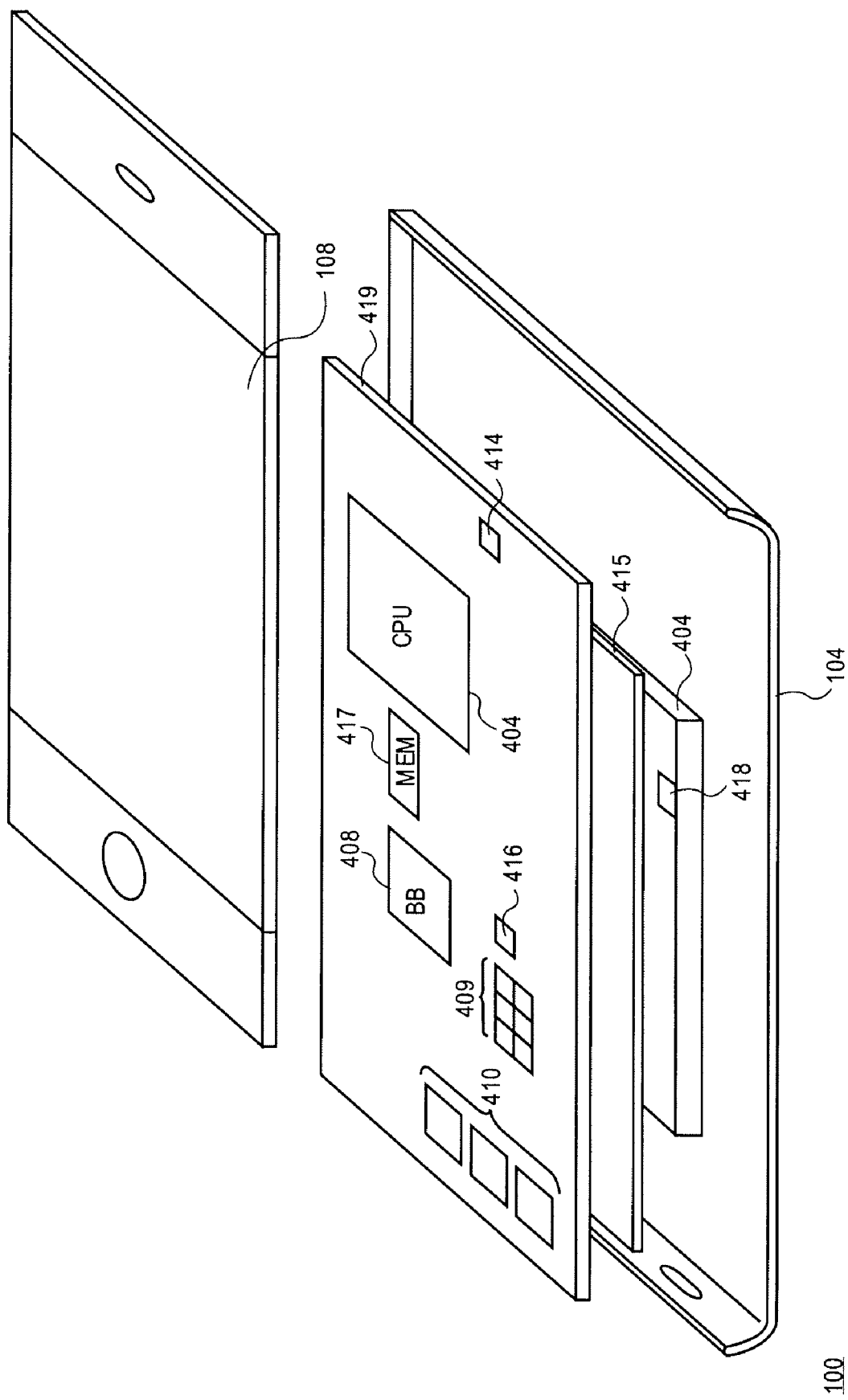
FIG. 4 is an internal view of different layers of components within the device of FIG. 3.
Figure 5:
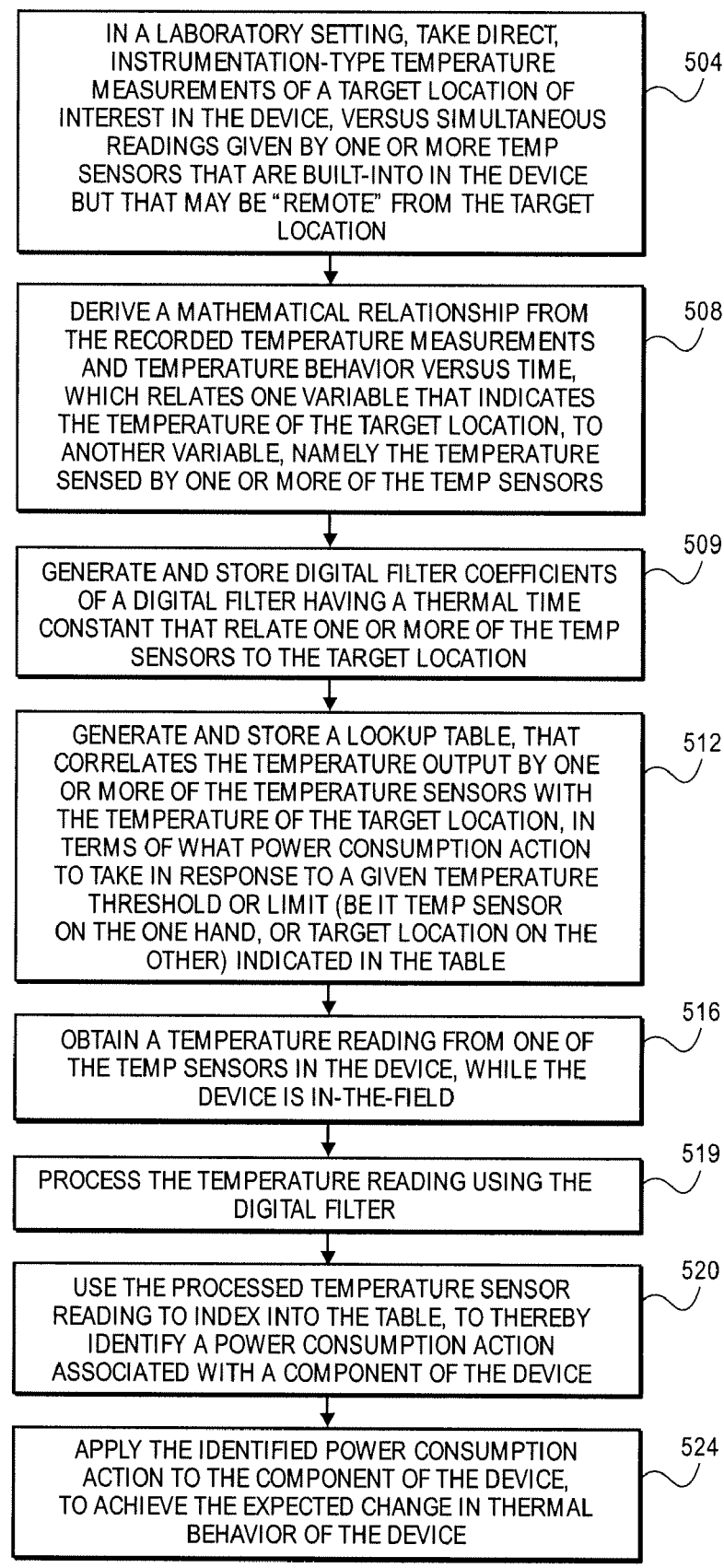
FIG. 5 is a flow diagram of a thermal management process in accordance with an embodiment of the invention.

A thermal management process in accordance with an embodiment of the invention is now described in some detail, with reference to the flow diagram of FIG. 5. The process can be used to control temperature in the example multi-function portable communications device 100 that is depicted in FIG. 3 and FIG. 4. FIG. 3 is an external view of the device, while FIG. 4 shows a few components of interest by revealing several layers that make up the device. This device 100 may be an iPhone™ device by Apple Inc. Briefly, the device 100 has within its external case or housing 102 the following components that operate together to provide cellular phone, web surfing and digital media playback functions to its user: a CPU 404, a touch sensitive display screen 108 with a built-in backlight, a cellular baseband processor 408, cellular network RF transceiver PAs 409, 410, microphone 114, receiver (ear speaker) 112, speaker 122, and battery 404. Note that the display screen 108 need not be touch sensitive; instead, user input may be had through a separate, built-in, physical keyboard or keypad (not shown). Additional temp sensors may be included, such as one that is associated with a Subscriber Identity Module, SIM card (not shown) or is on-chip with the baseband processor 408 in the device 100.

The battery 404 is located at the rear of the device 100, in front of a back case or panel 104 which is part of the external case 102, while the display screen 108 is at its front. The battery 404 faces the back face of a printed wiring board (pwb) 419 on which the CPU 404, baseband processor 408, and PA 410 are installed. A separator panel 415 may be included for greater structural integrity and/or heat insulation, between the battery 404 and the board 419. The PAs 409, 410 in this example are soldered to the front face of the board 419. There are also several temperature sensors, including a board temp sensor 414 located near an edge of the motherboard or baseboard, an RF temp sensor 416 located closer to the Pas 409, 410 than the board temp sensor 414, and a battery temp sensor 418 located closer to the battery 404 than either of the two other sensors. A thermal management program, stored in memory 417, may be executed by the CPU or by another processor within the device, to perform some of the operations recited in FIG. 5.

Referring now to FIG. 5, beginning in the laboratory setting, statistical techniques and direct, instrumentation-type temperature measurements of a target location of interest in the device are taken, versus simultaneously taken readings given by one or more temp sensors that are built-into in the device but that may be "remote" from the target location (block 504). A range of temperatures of interest are covered, e.g. 40-70 degrees, by heating the device 100 from an external source and/or allowing the device 100 to heat up by virtue of its own operation. In addition, a suitable time interval is defined over which the measurements are taken (e.g., several minutes). A number of specimens of the same device 100 can be connected to the instrumentation circuitry to take such measurements, and the resulting laboratory data is recorded for statistical analysis. A mathematical relationship may then be derived from the recorded lab data, which relates one variable that indicates the hot spot temperature, to another variable, namely the temperature sensed by one or more temp sensors (block 508). This relationship may have two aspects. First, there is the contribution by the thermal time constant introduced above in connection with FIG. 1 and FIG. 2A, to obtain the "processed" curve. This aspect is reflected in operation 509 in which digital filter coefficients are generated that shape the time response of a digital filter so that the filter's output matches the envelope of the temperature vs. time behavior of the target location, when its input is a sequence of temperature readings from one or more remote sensors. The computed filter coefficients are then stored or encoded in the manufactured specimens of the device 100. Second, a further relationship that makes an adjustment to the processed curve to obtain an estimate of the real temperature of the target location, is determined.

For example, consider a thermal management process that controls the temperature of the battery's hot spot. It has been discovered that the hot spot of the battery 404 may be the part of the battery that is closest to the PAs 409, 410. Instrumentation-based measurements of such a battery hot spot reveal that whenever it is near or in its maximum temperature range (as specified by, for example, the battery's manufacturer), this is generally due to the heat produced by the PAs 409, 410, which are located nearby. Thus, a better indicator of the battery hot spot temperature (in the absence of a temp sensor that just happens to be located at the battery hot spot) may actually be the RF temp sensor 416, which may be the sensor that is closest to and associated with the power amplifiers, PAs 409, 410. An even better indicator of the battery temperature is the processed version of the output of RF temp sensor 416, i.e. a sequence of temperature measurements made by the RF temp sensor 416 that has undergone digital signal processing designed to track the actual rise and fall in battery temperature. Such a digital filter may be defined in operation 509.

Figure 2A:
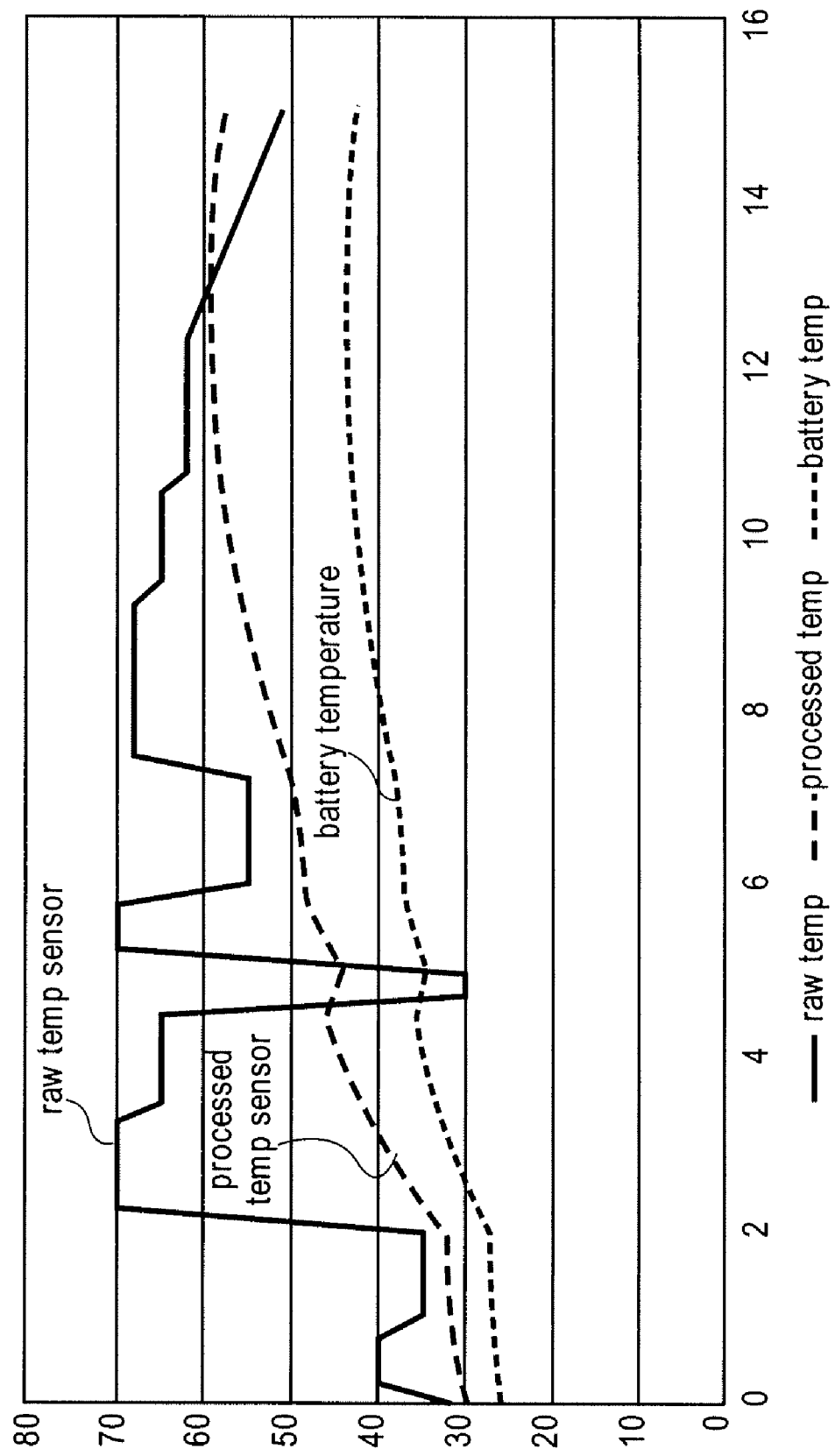

To obtain a relatively accurate estimate of the target location's temperature, a further mathematical relationship may be needed (e.g., to convert the "processed" curves of FIGS. 1-2A into estimates of the real target location temperature. In one case, a linear relationship between the two temperatures may be derived, in the form of, $$\text{Battery hot spot} = K1 + K2 * \text{processed\_RF\_temp\_sensor} \quad \text{(equation 1)}$$

where K1 and K2 are constants that are selected to best fit a curve (here, a straight line) to the experimental data representing the actual battery hot spot temperature. Thus, adjusting the processed RF temp sensor output in this manner is revealed to be a reasonably reliable predictor or estimator for the actual battery hot spot temperature, during field use of the device. This means the battery temp sensor (if one is used) need not be located at the hot spot.

In one embodiment of the invention, once the temperature relationship (equation 1) between battery hot spot and processed RF temp sensor has been determined in this manner, it may be reflected in a predefined lookup table stored in the memory 417 of the device 100 (block 512). The table associates or maps a list of battery hot spot temperatures of interest, e.g. those that are in a band at or near the maximum temperature specified by the battery's manufacturer, to processed RF temp sensor thresholds (in accordance with the predefined relationship). In addition, for each threshold (also referred to as a thermal event or temperature limit), the table lists a respective power consumption change command or function limit, to be issued in the device in response to the threshold being reached, to mitigate a thermal situation. For a given threshold, a corresponding blank entry in the Special Action column refers to a "no change" command, i.e. no change to the power consumption of the components in the device is needed. See for instance Table 1 below. Note each threshold value in the table may actually represent a respective, band or range of temperature values that define the thermal event. The relevant column here is the "Processed RF PA Sensor Threshold" column, which reflects the thermal time constant of a target location, e.g. the battery hot spot, relative to a temperature sensor located at the RF power amplifiers.

TABLE 1

| Notification Level | Range Percentage | Processed RF PA Sensor Threshold* | Processed Battery Sensor Threshold# | Special Action (power consumption change command) |
|---|---|---|---|---|
| 0 | 0% | 57.92 C. | 51.80 C. | |
| 1 | 13% | 58.02 C. | 51.97 C. | |
| 2 | 23% | 58.06 C. | 52.88 C. | |
| 3 | 25% | 59.13 C. | 53.72 C. | 70% Backlight |
| 4 | 32% | 59.60 C. | 54.47 C. | |
| 5 | 41% | 60.07 C. | 55.22 C. | 50% Backlight |
| 6 | 49% | 60.49 C. | 55.88 C. | |
| 7 | 56% | 60.85 C. | 56.46 C. | |
| 8 | 63% | 61.22 C. | 57.05 C. | |
| 9 | 69% | 61.54 C. | 57.55 C. | |
| 10 | 74% | 61.80 C. | 57.95 C. | |
| 11 | 80% | 62.11 C. | 58.46 C. | |
| 12 | 84% | 62.32 C. | 58.80 C. | Kill Applications |
| 13 | 89% | 62.58 C. | 59.21 C. | |
| 14 | 93% | 62.79 C. | 59.55 C. | |
| 15 | 97% | 63.00 C. | 59.88 C. | |
| 16 | 100% | 63.16 C. | 60.13 C. | Sleep |

*Correlated to battery hot spot
Correlated to back case/panel

Table 1 may be used in-the-field, as follows—see blocks 516-524 of the flow diagram in FIG. 5. Note that unless otherwise specified, the order in which the operations or steps of a process can occur is not limited to that which is shown in an associated flow diagram. Referring now to the flow diagram in FIG. 5, consider a reading taken from the RF temp sensor in the field and that has been processed in accordance with a thermal time constant associated with a target location (block 516). This single reading may be sufficient to index into the look up table, to determine what power consumption action to take; alternatively, it may be combined with a reading from one or more other temp sensors. Table 1 above indicates that once the processed RF temp has risen to a certain level, a particular action should be taken with respect to a certain component of the device. The table shows how to respond to progressively rising RF temp sensor readings. As the processed RF temp sensor rises to indicate about 59.13 degrees, the backlight is dimmed to 70% of its maximum power level. As the temperature continues to rise from there, the backlight is further dimmed to 50%. Eventually, the table indicates when most if not all applications executing in the device will be killed, as the temperature continues to rise. Finally, when a hot limit of the device is near, the table indicates that it is time to put the device into a low power sleep state. Thus, more generally, the temperature reading from a given temp sensor is used to index into the table, to thereby identify a power consumption action associated with a component of the device 100 (block 520). Next, the identified power consumption action is applied to the component (block 524), to achieve the expected change in thermal behavior of the device 100.

Note that the temperature threshold numbers in the tables here are only one instance of how each table can be populated. In addition, the threshold value is approximate, in that that there is a tolerance band around each value. The more general concepts described here are of course not limited to the specific numbers in any given table.

Also, the look-up table, which may be stored as part of thermal management software in the device 100, need not list all of the columns of Table 1. For example, the table may only list the (previously computed) temp sensor values and their respective power consumption actions, as correlated to real target location temperatures. The process in that case works by indexing directly into the look-up table, using a processed temp sensor reading. This may be viewed as the temp sensor domain embodiment. If desired, the estimated target location temperature can be obtained by plugging the processed temp sensor value into equation 1.

An alternative to working in the temp sensor domain is to work in the target location domain. In that case, the look-up table stored in the device 100 need only list the target location temperatures (and their respective power consumption actions). The process would then work by first plugging the processed temp sensor reading into equation 1, and then directly indexing into the look-up table with the computed or estimated target location temperature.

In accordance with another embodiment of the invention, a thermal management process (that can be executed in the device 100) controls the device's external case temperature. For such a process, the target location in the flow diagram of FIG. 5 becomes for example the center of the back case or panel 104 of the device 100. The in-the-field device portion of this process (namely blocks 516-524) may be executed in parallel with the battery hot spot process described above. Here, it has been discovered that the battery temp sensor output may be a reasonably reliable predictor for the external case temperature, particularly in the example device 100 depicted in FIG. 4. Experimental measurements and statistical techniques have yielded the following linear relationship between the temperatures of the processed battery temp sensor (processed in accordance with the thermal time constant given in Table 0 above) and the center of the back panel of the external case, $$\text{Back case center} = K3 + K4 * \text{processed\_batt\_temp\_sensor} \quad \text{(equation 2)}$$

where K3 and K4 are constants that are selected to best fit a straight line to the experimental data representing the actual back case center temperature. This relationship may be used to fill in the processed battery temp sensor values in the column identified by the same name, in Table 1 above. Here, the backlight is dimmed to 70% while in effect monitoring the back case panel, when the processed battery temp sensor reading is about 53.72 degrees. In contrast, when monitoring the battery hot spot through the processed RF PA temp sensor, the same dimming action occurs at about 59.13 degrees.

The above-described thermal management processes (in connection with Table 1) gave as examples several power consumption change commands for thermal mitigation, including backlight dimming, killing applications, and forcing the entire device 100 into a low power sleep state. Table 2 below gives an example of another thermal mitigation action, namely that of limiting RF transmit power. That table shows a list of battery hot spot temperatures of interest, mapped to corresponding processed RF PA temp sensor readings (using the predefined relationship obtained from experimental data), and the corresponding RF output or transmit power limits that are to be placed on the RF PA 409, 410 (see FIG. 4). Table 2 may be used by another thermal management process that is running in the device, in parallel with those described above in connection with Table 1. Table 2 describes how to limit the transmit power as a function of battery hot spot temperature, the latter having been correlated to the RF PA temp sensor which is being monitored.

TABLE 2

| Battery Hot Spot | Processed RF PA Sensor Threshold | Change command (RF Transmit Power Limit) |
| --- | --- | --- |
| 59.00 C. | 59.22 C. | 24.000 dBm |
| 59.33 C. | 59.52 C. | 23.625 dBm |
| 59.64 C. | 59.79 C. | 23.250 dBm |
| 59.93 C. | 60.04 C. | 22.875 dBm |
| 60.20 C. | 60.27 C. | 22.500 dBm |
| 60.53 C. | 60.56 C. | 22.000 dBm |
| 60.82 C. | 60.81 C. | 21.500 dBm |
| 61.09 C. | 61.05 C. | 21.000 dBm |

TABLE 2-continued

| Battery Hot Spot | Processed RF PA Sensor Threshold | Change command (RF Transmit Power Limit) |
| --- | --- | --- |
| 61.33 C. | 61.26 C. | 20.500 dBm |
| 61.60 C. | 61.49 C. | 19.875 dBm |
| 61.84 C. | 61.70 C. | 19.250 dBm |
| 62.09 C. | 61.92 C. | 18.500 dBm |
| 62.30 C. | 62.11 C. | 17.750 dBm |
| 62.51 C. | 62.29 C. | 16.875 dBm |
| 62.69 C. | 62.45 C. | 16.000 dBm |
| 62.86 C. | 62.60 C. | 15.000 dBm |
| 63.00 C. | 62.72 C. | 14.000 dBm |

Thus, combining two processes associated with Table 1 and Table 2 yields the following example scenario. When the processed RF PA temp sensor data, as correlated to the battery hot spot, indicates about 60.27, Table 1 suggests dimming the backlight to 50% while Table 2 suggests limiting the RF transmit power to 22.5 dBm. One or both of these thermal mitigation actions are then taken (FIG. 5, operation 524).

A further thermal management process is now described that may also be running in parallel with those described above. This process accesses Table 3 (see below) while effectively monitoring the back case temperature, based on the previously determined temperature relationship that correlates the back case temperature with processed battery temp sensor data (here, thermistor output data). In this process, the power consumption mitigation action taken at a given temperature threshold includes limiting the RF transmit power to the specified level. For example, according to Table 3, the RF transmit power of the device 200 shall not be allowed to increase above 21 dBm when the processed battery temp sensor data (as correlated to the center of the back case) is indicating about 56.79 degrees.

TABLE 3

| Back Case Center | Processed Battery Thermistor Limit | Change command (RF PA Tx Limit) |
| --- | --- | --- |
| 48.00 C. | 53.89 C. | 24.000 dBm |
| 48.23 C. | 54.20 C. | 23.750 dBm |
| 48.44 C. | 54.50 C. | 23.500 dBm |
| 48.64 C. | 54.78 C. | 23.250 dBm |
| 48.84 C. | 55.05 C. | 23.000 dBm |
| 49.02 C. | 55.31 C. | 22.750 dBm |
| 49.20 C. | 55.55 C. | 22.500 dBm |
| 49.45 C. | 55.90 C. | 22.125 dBm |
| 49.68 C. | 56.22 C. | 21.750 dBm |
| 49.89 C. | 56.51 C. | 21.375 dBm |
| 50.09 C. | 56.79 C. | 21.000 dBm |
| 50.27 C. | 57.04 C. | 20.625 dBm |
| 50.49 C. | 57.35 C. | 20.125 dBm |
| 50.70 C. | 57.64 C. | 19.625 dBm |
| 50.92 C. | 57.95 C. | 19.000 dBm |
| 51.16 C. | 58.28 C. | 18.250 dBm |
| 51.40 C. | 58.61 C. | 17.375 dBm |
| 51.62 C. | 58.92 C. | 16.375 dBm |
| 51.82 C. | 59.20 C. | 15.250 dBm |
| 52.00 C. | 59.44 C. | 14.000 dBm |

As the back case becomes "too hot", for example during a phone call made when the device has been left inside a car in the sun for a few hours, the RF transmit power might have to be limited to such a low level (based on Table 3), that the cellular base station tower with which the device 100 is communicating may decide to drop the ongoing phone call or, if possible, initiate a smooth hand over of the call from, for example, a 3G cellular network to one that uses lower (overall) RF power, e.g. a 2G network. Slowly reducing the available transmit power in the manner shown in Table 3 may be a better option than the device 100 itself deciding to drop the call altogether (e.g., by killing a cellular phone application that is running). Reducing the available transmit power gradually as indicated in Table 3, while allowing an ongoing call to continue even as the device gets hotter, will give the cellular network a chance to hand over the call to another wireless cellular network communications protocol that calls for lower power consumption in the device 100.

Note that in some cases, such as in a 3G cellular network, the cell tower may be continuously or repeatedly commanding each of the phones with which it is communicating to adjust their respective RF transmit power levels during phone calls (e.g., as a particular phone moves closer to or farther from the cell tower, or as the number of active phone calls being handled by the cell tower changes). In some cases, there may be a conflict between the command from the cell tower and the command in Table 3, e.g. the cell tower may demand more power, while Table 3 requests a reduction (due to increasing, processed battery temp sensor readings). In that case, Table 3 may override the cell tower's request for greater power.

In other cases, the cell tower may signal the device 100 to reduce its transmit power level, even while Table 3 allows a higher limit. In those situations, the device may prefer to operate at the lower level.

Hysteresis may be incorporated into the thermal management processes described above. For example, with hysteresis, as the device cools off and the temp sensor readings drop, a higher power consumption command or limit (indicated in one of the tables above and that is associated with the new lower temperature level), is not resumed immediately. Rather, the process delays resumption of the higher power consumption level, to for example ensure that the device is in fact cooling off at a sufficiently high rate. For instance, hysteresis may require that the processed temp sensor reading further drop by about ½ degree, relative to one of the threshold levels indicated in the table, before the higher power consumption associated with that threshold level is resumed or permitted.

In addition to the processes described above, the device 100 may also have a fail-safe process or mode in which several components of the device (e.g., cellular network PA, backlight, music player functionality) are essentially shut down due to excessive temperature. For example, the fail-safe mode may be entered when there is a thermal event that risks violating the predefined maximum battery temperature range, e.g. beyond 63 degrees.

As a precursor to the fail-safe mode, the device 100 may have a process that first alerts the user, by showing a graphic on the display screen 108, when a temperature limit that is near a hot limit (or other maximum specified operating temperature of the device) has been reached. For example, the battery hot spot may be at its manufacturer specified maximum, or the back case center may be at a UL specified maximum or other maximum user comfort temperature. This allows the user himself to then immediately end the call for example, or shut down a particularly power-hungry application that may be running. Alternatively, the process could automatically invoke a reset and/or reboot of the entire device and its operating system. This might be able to alleviate the high temperature situation, assuming that it has been caused by a problem within the device (e.g., a defective software routine or a defective piece of hardware). If following completion of the reset/reboot the device does not cool off, despite certain power hungry applications no longer running being active, then the entire device 100 may be automatically shut down. This reflects an understanding, by the thermal management processes, that the current thermal situation in the device likely has external causes beyond its control.

So far, various thermal management processes have been described which may be based on indexing into a look up table, using either a processed temp sensor reading or a further correlated value that represents the actual temperature of the target location, to determine what power consumption action to take in the device. It should be understood that the look up table is thus said to correlate temp sensor readings with the expected, actual temperature of a remote, target location. However in doing so, the look up table need not actually contain a list of either of those values. For example, Table 1 above lists only processed RF PA temp sensor values, not raw sensor readings (and one or more associated power consumption actions, "Special Actions" column, that are suggested to mitigate, e.g., reduce, the actual temperature of the target location at selected temperature thresholds). As an alternative, the list of processed readings could be mapped to (and replaced with) their corresponding, computed target location values. See for example equation 1 which gives the computed temperature values of the battery hot spot, based on processed RF PA temp sensor readings.

One or more of the above-described thermal management processes can run in parallel, to control the power consumption of various components of the device simultaneously, based on information obtained from the same temp sensors. Other than when using the hysteresis effect mentioned above, these processes need not have any memory of for example how long (time wise) a particular processed temp sensor variable has been indicating above a given threshold. See FIG. 2B, showing the "open loop" nature of the process. In addition, they do not actually regulate the temperature of a given part of the device, to ensure that it stays in a narrow, target range. Rather, they respond to temperature changes (according to the tables) across a relatively broad range. For instance, Table 1 covers the ranges 57-64 degrees and 51-61 degrees, the range for Table 2 is 59-63 degrees, and the range for Table 3 is 53-60 degrees.

In another embodiment of the invention, a regulating closed loop thermal management process (that runs in the device) regulates the temperature of a target location within a relatively narrow temperature range, based on taking readings from one or more remotely located temp sensors in the device 100. For instance, a suitable, relatively narrow, battery hot spot temperature range may be 62-64 degrees. In general, this battery temperature band should be not too high as to significantly reduce the life of the battery (or render the external case too hot), and not too low to render inefficient operation given the battery chemistry. A process that can maintain this narrow temperature is depicted in FIG. 6.

Figure 6:
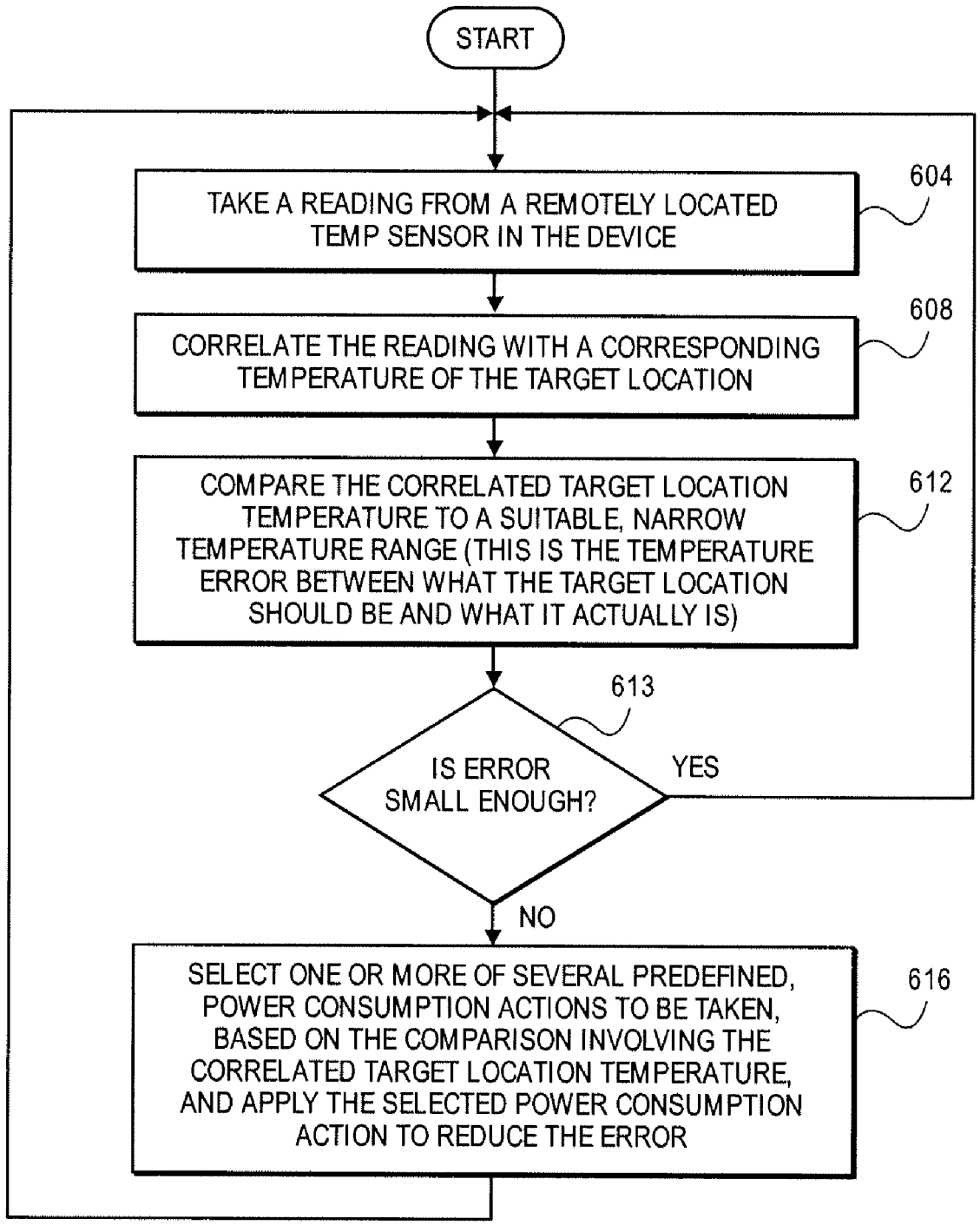
FIG. 6 is a flow diagram of a thermal management process in accordance with another embodiment of the invention.

Referring now to FIG. 6, a sample, processed reading is taken, from a sequence of such readings taken from a remotely located temp sensor in the device 100 (block 604). The sequence of readings had been processed, so that they correlate better with the temperature behavior of a target location. Next, the sample, processed reading is further correlated with the temperature of the target location (block 608). The latter may be performed in part by inserting the processed temp sensor value into a previously defined equation (e.g., one of the linear equations described above), that actually computes an accurate estimate of the corresponding target location temperature. The computed target location temperature is then compared to the suitable, battery hot spot range (block 612) to determine an error. If the error is not small enough (block 613), then one or more of several predefined, power consumption actions that would reduce the error are selected and applied (block 616). The expectation is that this application of power consumption actions will correct the target location's temperature, back into the suitable range.

In some cases, a temp sensor's behavior history, and/or a thermal time constant associated with the sensor, has been stored in memory of the device, either by itself or correlated to that of a target location. This information can be consulted, e.g. as part of block 616, to further determine for example the strength of the power consumption action that will be taken. For instance, if the back case center has been steadily cooling for the past 30 seconds (as indicated by monitoring the battery temp sensor for example), even though the back case center is still above its suitable temperature range, the limit on RF transmit power of the device 100 should be reduced only slightly, as compared to the situation where the back case center has been fluctuating (rather than steadily cooling) above its suitable range.

An embodiment of the invention is an electronic device comprising:

means for sensing a temperature of the device (e.g., thermistor built into the device;

means for correlating temperature of the sensing means with temperature of another location in the device, in terms of what power consumption action to take for a given temperature of the sensing means that has been correlated to a corresponding temperature of said another location (e.g., a look up table stored in the device that includes a list of temp sensor values and/or a list of target location temperatures, plus their respective power consumption actions which have been selected manage thermals at the target location);

means for accessing the correlating means to identify said power consumption action which is associated with a component in the device (e.g., software running in the device that processes the temp sensor readings by a) indexing directly into a list of temp sensor values, or b) first converting the temp sensor readings and the indexing directly into a list of target location temperatures; and means for applying the identified power consumption action to the associated component of the device (e.g., software running in the device that signals a CPU, an RF PA, or a backlight to limit its power consumption even at the expense of reduced performance by the component).

An embodiment of the invention may be a machine-readable medium having stored or encoded thereon instructions which program a processor to perform some of the operations described above. In other embodiments, some of these operations might be performed by specific hardware components that contain hardwired logic. For example, the digital filter 203 in FIG. 2B may be implemented entirely as a programmable logic array circuit, or entirely as a programmed data processor. Those operations might alternatively be performed by any combination of programmed computer components and custom hardware components.

A machine-readable medium may include any mechanism for storing or transmitting information in a form readable by a machine (e.g., a computer), not limited to Compact Disc Read-Only Memory (CD-ROMs), Read-Only Memory (ROMs), Random Access Memory (RAM), and Erasable Programmable Read-Only Memory (EPROM).

The invention is not limited to the specific embodiments described above. For example, the temperature threshold numbers in the tables here are only one instance of how each table can be populated. In addition, the threshold value is approximate in that that there is a tolerance band around each value. The more general concepts described here are of course not limited to the specific numbers in any given table. Accordingly, other embodiments are within the scope of the claims.

What is claimed is:

1. A method for thermal management of an electronics device, comprising:
    monitoring temperature of a target location in a device without having a temperature sensor at that location, by
        (a) filtering a sequence of temperature readings from a temperature sensor that is at a remote location in the device, and
        (b) using one of the filtered temperature readings to access a look up table, that lists temperature thresholds and corresponding power consumption commands, and thereby identify a power consumption command associated with a component of the device,
    wherein the corresponding power consumption commands include a plurality of no change commands and at least one change command that limits or reduces power consumption of a component in the device, wherein the look up table correlates temperature at the temperature sensor with temperature at said target location in the device.

2. The method of claim 1 further comprising:
    repeating (b) so as to use another one of the filtered temperature readings to access the look up table, until said at least one change command is identified; and
    applying the identified change command to limit or reduce power consumption of a component of the device.

3. The method of claim 1 wherein the list of temperature thresholds in the look up table refers to temperature at said target location of the device, and
    wherein using the filtered temperature reading to access the look up table comprises converting, using a predefined mathematical relationship, the filtered temperature reading into a value that refers to temperature at said target location.

4. The method of claim 1 wherein the list of temperature thresholds in the look up table refers to filtered temperature readings, wherein using the filtered temperature readings comprises:
    directly indexing into the look up table with the filtered temperature reading.

5. The method of claim 2 wherein applying the identified change command to the component of the device comprises:
    limiting RF transmit power of a cellular network transceiver in the device to a level that is indicated by the identified change command.

6. The method of claim 2 wherein applying the identified change command to the component of the device comprises:
    reducing light output of a display screen backlight in the device to a level that is indicated by the identified change command.

7. The method of claim 1 wherein applying the identified change command to the component of the device comprises:
    reducing clock frequency or supply voltage of a data processing unit in the device to a level that is indicated by the identified change command.

8. A method for thermal management of an electronic device, comprising:
    reading a first temperature sensor that is located in a device closer to a first component of the device than second and third components of the device;
    reading a second temperature sensor that is located in the device closer to the second component than the first and third components; and
    correlating readouts from the first temperature sensor with readouts from the second temperature sensor to extrapolate temperature of a selected one of the first, second and third components, and on that basis changing a power consumption limit of the selected component.

9. An electronic device comprising:

a temperature sensor; and a thermal manager having a digital filter whose input is to receive raw temperature values from the sensor and whose output is to provide processed temperature values according to a filter function that correlates temperature at the sensor with temperature at another location in a device, the thermal manager having a look-up table that further correlates temperature at the sensor with temperature at said another location, the look-up table having a list of temperature values, representing a temperature range at the sensor or at said another location, and a plurality of power consumption change commands associated with the list of temperature values, respectively, the thermal manager to access the look-up table a plurality of times, each time using a different one of the processed temperature values, to identify a plurality of power consumption change commands and evaluate the identified plurality of power consumption change commands to determine what change, if any, should be commanded to the power consumption of a component in the device.

10. The electronic device of claim 9 further comprising:

a wireless communications transceiver RF power amplifier, wherein one of the identified power consumption change commands is an RF output power limit on the wireless communications transceiver RF power amplifier.

11. The electronic device of claim 9 further comprising:

a display screen having a backlight, wherein one of the identified power consumption change commands is a brightness limit on the backlight.

12. The electronic device of claim 9 further comprising:

a central processing unit, CPU, wherein one of the identified power consumption change commands is a processor clock limit or supply voltage limit on the CPU.

13. The electronic device of claim 9 wherein the thermal manager comprises memory in which is stored a history of temperature readings from the sensor that have been correlated to temperature of said another location, the thermal manager to consult the stored history and on that basis modify the change that is commanded to the power consumption of the component in the device.

14. An electronic device comprising:

a temperature sensor disposed at a first location of a device that is remote from a second location of the device; and a thermal manager to process a sequence of temperature readings from the temperature sensor to obtain a sequence of processed temperature readings, the thermal manager having a look up table that lists a plurality of temperature thresholds associated with a plurality of power consumption commands, respectively, wherein the power consumption commands include a plurality of no change commands and at least one change command that limits or reduces power consumption of a component in the device, the thermal manager to select a plurality of the sequence of processed temperature readings and use each selected processed reading to access the look up table and thereby identify a power consumption command, and to evaluate the identified power consumption command to determine what change, if any, should be commanded to mitigate a thermal event in the device.

15. The electronic device of claim 14 wherein the second location is a location whose temperature behavior, in response to an input heat source at the first location, is substantially different than that of the first location.

16. The electronic device of claim 14 wherein the thermal manager is to implement hysteresis such that as the device cools off, an identified power consumption command from the look up table that increases power consumption of a component in the device is not resumed immediately but rather is delayed until the device cools off further.

17. The electronic device of claim 14 wherein the power consumption commands in the look up table include at least one that alerts a user of the device about temperature in the device, by showing a graphic on a display screen of the device.

18. The electronic device of claim 14 wherein the plurality of temperature thresholds listed in the look up table are in a range 50-65 degrees Centigrade.

* * * * *